J. M. CHILDS.

HARROW.

No. 10,893. Reissued Jan. 10, 1888.

Witnesses

Edwin L. Bradford

Frank Dorian

Inventor

J. M. Childs.

By his Attorney

Ridley Duncan & Perry Attys

THE NORRIS PETERS CO., PHOTO-LITHO., WASHINGTON, D. C.

UNITED STATES PATENT OFFICE.

J. MORRIS CHILDS, OF UTICA, NEW YORK, ASSIGNOR TO J. M. CHILDS & CO., OF SAME PLACE.

HARROW.

SPECIFICATION forming part of Reissued Letters Patent No. 10,893, dated January 10, 1888.

Original No. 346,266, dated July 27, 1886. Application for reissue filed November 28, 1887. Serial No. 256,362.

*To all whom it may concern:*

Be it known that I, J. MORRIS CHILDS, of Utica, in the county of Oneida and State of New York, have invented certain new and useful Improvements in Harrows; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention relates to an improvement in harrows; and it consists in the mechanism hereinafter more fully pointed out and claimed.

Figure 1:
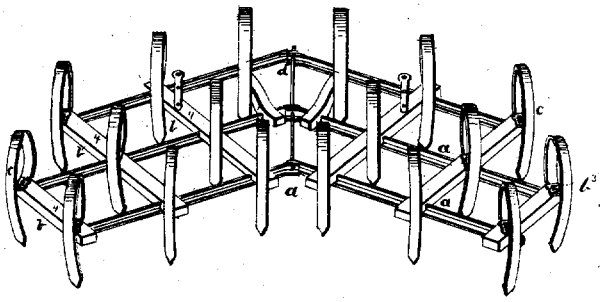
Figure 2:
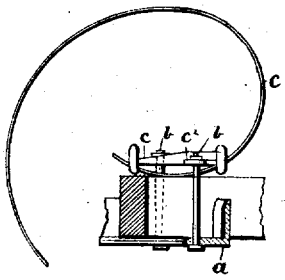
Figure 3:
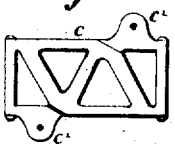
Figure 4:
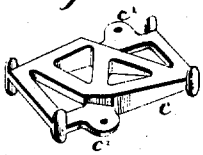

In the accompanying drawings, Figure 1 represents a perspective view of my improved harrow. Fig. 2 is a side view of a spring-tooth, a side view of a section of the cross-beam, and a cross-section of an angle draft-bar. Fig. 3 is a plan view of the reversible clip, which can be used on either half of the harrow. Fig. 4 is a perspective view of my reversible clip.

In the accompanying drawings similar letters of reference refer to corresponding parts throughout the several views.

In constructing my improved harrow it is preferably constructed in two parts, with central hinges to accommodate the uneven surface of the ground and to facilitate the passage of stone and similar obstructions. It is quite obvious that any other form of construction may be adopted without departing from the spirit of my invention. For forming a broad wearing-surface on the under side of the frame and to facilitate the construction of my improved harrow, I provide angle draft bars *a a a* and *a′ a′ a′*, which are preferably formed of steel with an angle-bend in cross-section, substantially as indicated in Fig. 2. One angle of the bar forms a broad wearing-surface when the harrow is in use, and the other angle forms a rib or brace, which is preferably let into suitable grooves in the cross-beams.

*b*, Fig. 2, represents the grooves in the cross-beam. The angle-bar is provided with perforations on either side of the cross-beams at their intersection. The two are held in union by bolts *b′ b′*, which are inserted in the perforations in the angle-bar and passed through the perforated ears in the clip, which forms a device for holding the tooth in place. The bolts are provided with threaded nuts.

I provide two or more cross-beams, which are placed substantially at right angles to the draft-bars, and are preferably of wood, with cross-grooves for receiving one angle of the draft-bars. It is quite obvious that the cross-beams may be placed at an oblique angle from the draft-bars without departing from the spirit of my invention.

$b^3$ $b^3$ $b^3$ and $b^4$ $b^4$ $b^4$ represent the cross-beams, which are held in union with the draft-bars, substantially as hereinbefore described.

I provide curved teeth *c*, which are bent forward, upward, rearward, and downward, so that the point of each tooth falls below the frame, and each tooth is adjustable up or down to regulate the cut. The teeth are attached to the frame, on which they are adjustable by clip *c′*, which is provided with projecting perforated ears $c^1$ $c^2$ and lugs. These lugs embrace the surface of the tooth upon either side, each tooth being admitted between the lugs, which are provided to prevent the teeth from turning, and each clip may be used on either half of the harrow by reversing the same. The extremes of the clip embrace the inner circle of the tooth, the latter being placed on the upper surface of the frame. The circular form of the tooth, with the straight clip placed thereon, forms a space between the tooth and the center of the clip, by means of which an elastic bearing is formed, by means of which a continuous strain is kept on the nuts, thereby preventing the same from jarring or working loose. By loosening or tightening the nuts and moving the tooth an adjustment of the tooth is secured.

The harrow shown in the drawings has a central joint or joints, which are formed by bending the ends of the angle draft-bars and perforating the same, which are placed in union and held by bolts or rods.

*d d d* represent the bent and perforated ends of the draft-bars overlapping each other, and held by rod *d′* for forming the joints or hinges.

I am aware that hinges have been formed in harrows by bending the projecting ends of metallic cross-bars which overlap each other, which ends are perforated for receiving a connecting-rod. This I do not claim.

In forming the angle draft-bars I preferably use steel, although any other suitable metal may be used without departing from the spirit of my invention.

What I claim as new, and desire to secure by Letters Patent, is—

1. The combination, in a harrow having cross-beams with cross grooves on the under side of the beam for receiving the angle of the draft-bars, of the draft-bars constructed of metal, having an angle-bend in the cross-section, with means for retaining the two in fixed relation, substantially as described.

2. The combination, in a harrow, of the grooved cross-beams and the metallic draft-bars having an angle-bend in cross section for fitting the grooves in the cross-beams, with means for retaining the two in fixed relation, substantially as described.

3. The combination, in a harrow having metallic angular draft-bars and slotted cross-beams for fitting the angle of the draft-bars at the intersection, of the curved spring-teeth, a fastening-clip, formed as described, whereby its extremes engage the inner surface of the tooth, with means for holding the clip in fixed relation to the tooth, substantially as set forth.

4. The combination, in a harrow having metallic angle draft-bars and slotted cross-bars for fitting the angle of the draft-bars at their intersection, of the curved tooth held to the upper surface of the frame, substantially as described.

5. The combination, with the cross-beams, draft-bars, and curved tooth on the upper surface of the cross-beams, of the reversible clip with perforated ears and projecting lugs extending from both surfaces of the clips for engaging the tooth and preventing the same from turning and for adjusting the length of the cut of the tooth, with means for holding the clip to the tooth, substantially as described.

6. A harrow having the following elements in combination: cross-beams, the metallic draft-bars formed with an angle-bend in cross-section, the curved tooth, the fastening-clip for engaging the tooth, the retaining-bolts for engaging the clips, and angle draft-bars for retaining in fixed relation the tooth, cross-beams, and angle-bar, substantially as shown.

7. The combination, in a harrow having metallic angle draft-bars and slotted cross-bars fitting the angle of the draft-bars at their intersection, of the hinges formed by the extension ends of the angle draft-bars perforated and bent for overlapping each other, with bolt or rivet for securing said hinges, substantially as described.

8. A harrow having the following elements in combination: cross-beams, metallic draft-bars formed with an angle-bend in cross-section, the curved teeth, fastening-clip for engaging the tooth, retaining-bolts for engaging the clips, and angle draft-bars for retaining in fixed relation the teeth, cross-bars, and draft-bars, bent, perforated, and lapping ends of the metallic draft-bars held in union by rod or bolt for forming a joint or hinge, substantially as set forth.

9. The combination, in a harrow, of the angle draft bars, the grooved cross-beams, and the tooth at the intersection, substantially as shown.

10. The combination, with a harrow-frame, of a curved spring-tooth, a flat seat on which the tooth is mounted, and a fastening-clip spanning the tooth and held thereto by bolts and nuts.

11. The combination of a curved spring-tooth mounted on a flat seat on the frame, a fastening-clip spanning the tooth and engaging the inner curve thereof, and bolts and nuts, for the purposes stated.

12. A clip, combined with bolts, for fastening a spring-curved harrow-tooth to a seat, substantially as described, the essential characteristics of such clip being that it bears upon the tooth and engages by projections its opposing edges to prevent edgewise vibration thereof.

In witness whereof I have affixed my signature in presence of two witnesses.

J. MORRIS CHILDS.

Witnesses:
EDWIN H. RISLEY,
CHAS. A. LONG.